United States Patent [19]

Asano et al.

[11] Patent Number: 4,480,002

[45] Date of Patent: Oct. 30, 1984

[54] DYESTUFF-CONTAINING MICROSCOPIC CAPSULE SUSPENSION FOR RECORD MATERIALS

[75] Inventors: Makoto Asano; Kiyoharu Hasegawa, both of Yokohama; Hiroyuki Akahori, Yokosuka; Michihiro Tsujimoto, Tachikawa, all of Japan

[73] Assignee: Mitsui Toatsu Chemicals, Incorporated, Tokyo, Japan

[21] Appl. No.: 326,005

[22] Filed: Nov. 30, 1981

[30] Foreign Application Priority Data

Dec. 12, 1980 [JP] Japan ................................ 55-174659

[51] Int. Cl.[3] ................................................ B32B 3/26

[52] U.S. Cl. ..................................... 428/402.2; 8/526; 8/527; 106/21; 264/4.3; 346/220; 346/221

[58] Field of Search .................... 252/316; 8/526, 527; 428/320.6; 282/27.6; 106/21

[56] References Cited

U.S. PATENT DOCUMENTS

| | | | |
|---|---|---|---|
| 3,806,463 | 4/1974 | Konishi | 8/526 |
| 3,916,070 | 10/1975 | Ozutsumi | 282/27.5 |
| 3,934,069 | 1/1976 | Atzrott | 252/316 |
| 3,939,095 | 2/1976 | Sliwka | 8/526 |
| 4,055,358 | 10/1977 | Garner | 282/27.5 |
| 4,191,690 | 3/1980 | Burri | 428/320.6 |
| 4,295,663 | 10/1981 | Petitpierre | 428/320.6 |
| 4,302,393 | 11/1981 | Garner | 282/27.5 |

*Primary Examiner*—Paul R. Michl

*Attorney, Agent, or Firm*—Fisher, Christen & Sabol

[57] ABSTRACT

Dyestuff-containing microscopic capsule suspension for record materials, containing in microscopic capsules a lactone family dyestuff represented by the general formula (I):

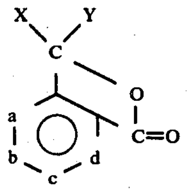

(I)

wherein a, b, c and d are each a carbon atom or either one or two atoms of said a, b, c and d are nitrogen atoms and the remaining atoms are carbon atoms, said a, b, c and d may have one or two substituent groups, adjacent a–b, b–c or c–d bond may form another ring, X and Y represent individually a benzene, naphthalene or aromatic heterocyclic ring which may include one or more substituent groups, and X and Y may be the same or different and may be coupled together to form a ring; and a metal ion sequestering agent in the capsules or a liquid medium in which the capsules are suspended.

3 Claims, No Drawings

DYESTUFF-CONTAINING MICROSCOPIC CAPSULE SUSPENSION FOR RECORD MATERIALS

BACKGROUND OF THE INVENTION (1) Field of the Invention

This invention relates to an improved dyestuff-containing microscopic capsule suspension for record materials, which capsules are prevented from coloration, and more particularly to a suspension in a liquid medium of microscopic capsules of a hydrophobic solvent solution containing an electron donative dyestuff which capsules are prevented from coloration and adopted to produce record materials such as pressure sensitive recording paper.

(2) Description of the Prior Art

As a recording system making use of the color reaction through the mutual contact between a wide variety of electron donative dyestuffs and electron acceptive acidic developers, there have been known pressure sensitive recording paper and the like.

The production of such pressure sensitive recording paper has been considerably increased in recent years as carbonless duplicating paper (i.e., non-carbon paper) with the trend of office work rationalization and the popularization of computers. Its demand is expected to increase still further in the future.

Pressure sensitive recording paper was first rendered marketable upon completion of the microencapsulation technology for a solution containing an electron donative dyestuff, taking the hint from the color reaction between crystal violet lactone (hereinafter, abbreviated as "CVL") and acidic terra abla. Owing to the subsequent technology improvement in various fields such as dyestuffs, developers, solvents for dyestuffs, microencapsulation technique and coating technique, the quality and performance of pressure sensitive recording paper have been steadily improved.

As electron acceptive acidic developers, in addition to acidic terra abla which has been used from the dawn of pressure sensitive recording paper, other developers have been proposed and actually used, including phenol-formaldehyde polymer, metal-modified phenol-formaldehyde polymer, substituted salicylic acids and their multivalent metal salts.

As electron donative dyestuffs, a number of dyestuffs have been proposed including (1) various phthalide dyestuffs led by CVL; (2) various fluoran dyestuffs; (3) various azaphthalide dyestuffs; (4) leucoauramine dyestuffs; (5) phthalan dyestuffs; (6) spiropyran dyestuffs; (7) acylleucophenothiazine dyestuffs; (8) diphenylmethane dyestuffs; and (9) triphenylmethane dyestuffs. In accordance with the development of new developers, besides CVL (phthalide) and benzoylleucomethylene blue (acylleucophenothiazine) that have actually been used from the beginning, varied types of phthalide dyestuffs, fluoran dyestuffs and azaphthalide dyestuffs have been adopted for actual use or are about to be used actually.

These dyestuffs are dissolved in a dyestuff solvent and encapsulated for use in the production of pressure sensitive recording paper. In such microcapsules, in place of polychlorinated biphenyls which were employed in the beginning, other hydrophobic solvents of low toxicity and high boiling point have been proposed and actually used including partially hydrogenated terphenyls, alkyldiphenyls, alkylbenzenes, alkylnaphthalenes, diallylalkanes and alkyldiphenylethers.

Regarding the microencapsulation method of the dyestuff-containing solvent, in addition to the microencapsulation making use of the gelatin-type coacervation method which was employed in the initial stage of the microencapsulation technology, a wide variety of microencapsulation techniques which are improved in both quality and applicability and make use of synthetic resin (for example, urea-formaldehyde, melamine-formaldehyde, polyamide and polyurethane resins, etc.) have been proposed. Some of such new microencapsulation techniques have already been employed in actual production.

Owing to the above-described development of varied relevant techniques, it has been feasible with presently available pressure sensitive recording paper to form color images of varied hues such as red, green, black, purple and yellow deep and stably on a surface coated with a developer, although conventional pressure sensitive recording paper could develop blue color only.

However, many of phthalide, fluoran and azaphthalide dyestuffs, which are used extensively as dyestuffs for pressure sensitive recording paper, are liable to coloration during their microencapsulation steps through their dissolution in a hydrophobic solvent of a high boiling point and subsequent microencapsulation of the thus-formed dyestuff-containing solvent in accordance with varied methods or during the storage of the thus-prepared microcapsule suspension. Furthermore, certain pressure sensitive recording papers (CB-paper) are colored on the surfaces coated with such dyestuff-containing microcapsule suspension or are gradually colored during their storage. This coloring problem has been considered to be a serious problem in the production technology of pressure sensitive duplicating paper and a solution thereto has been earnestly waited for.

SUMMARY OF THE INVENTION

An object of this invention is to provide a dyestuff-containing microcapsule suspension for record materials, which suspension is not colored or colored extremely little and exhibit no coloring tendency along the passage of time even over a long storage period.

The present invention provides the following microcapsule suspension for record materials:

An improved dyestuff-containing microscopic capsule suspension for record materials, comprising in microscopic capsules a lactone family dyestuff represented by the general formula (I):

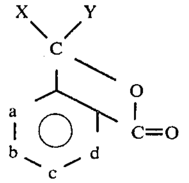

(I)

wherein a, b, c and d are each a carbon atom or either one or two atoms of said a, b, c and d are nitrogen atoms and the remaining atoms are carbon atoms, said a, b, c and d may have one or two substituent groups, adjacent a–b, b–c or c–d bond may form another ring, X and Y represent individually a benzene, naphthalene or aromatic heterocyclic ring which may include one or more substituent groups, and X and Y may be the same or different and may be coupled together to form a ring; and a metal ion sequestering agent in the capsules or a liquid medium in which the capsules are suspended.

DETAILED DESCRIPTION OF THE INVENTION

It has been found that a dyestuff-containing microcapsule suspension of extremely little coloration can be obtained and a pressure sensitive recording paper obtained by coating thereon the above-mentioned microcapsule suspension is colored extremely little and does not exhibit coloring tendency during the storage thereof by using a metal ion sequestering agent in a step of dissolving a lactone family dyestuff represented by the aforementioned general formula (I) in a hydrophobic solvent and then microencapsulating it into fine oil droplets coated with a gelatin or synthetic resin film in accordance with the coacervation, interfacial polymerization or in-situ polymerization method. The above-described lactone family dyestuff and the solvent therefor are contained as core materials inside the microcapsules and the metal ion sequestering agent is contained inside and/or outside microscopic capsules.

In the above-defined general formula (I), specific examples of the aromatic heterocyclic rings represented by the formulae X and Y include

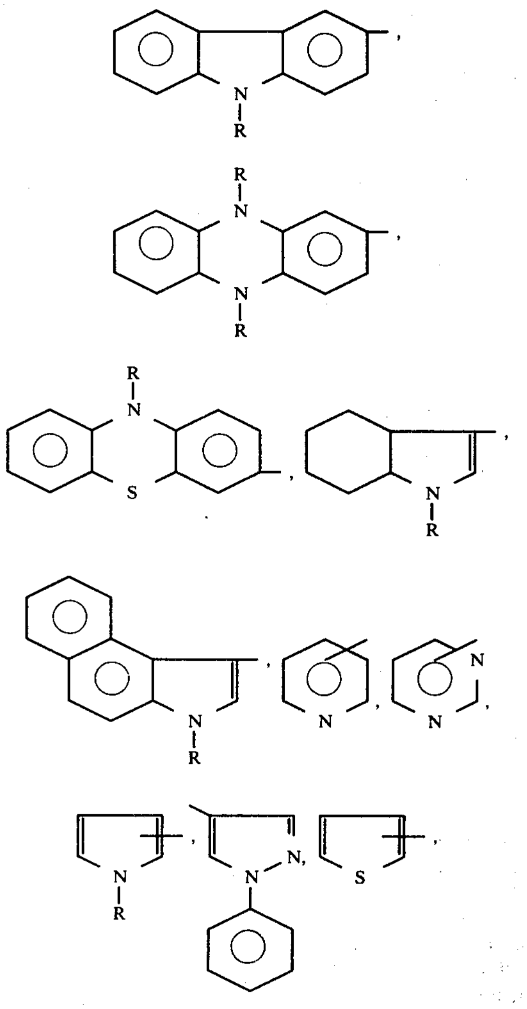

-continued

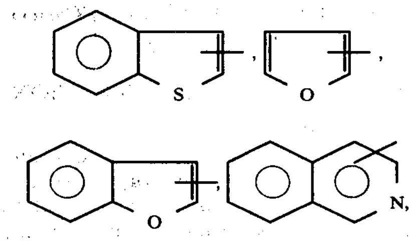

wherein R denotes a hydrogen atom or a substituent group. However, the aromatic heterocyclic rings shall not be interpreted as being limited to such specific examples.

On the other hand, the exemplary substituent group or groups which may be united to one or more carbon or hetero atoms in the benzene, naphthalene or aromatic heterocyclic rings represented by X and Y in the general formula (I) include hydrogen atom; halogen atoms; alkyl, cycloalkyl, phenyl, benzyl, alkoxy, benzyloxy and piperazinyl groups which may be substituted; amino group; monoalkylamino groups; dialkylamino groups; morpholino group; polymethyleneamino groups (such as pyrrolidyl group and piperidyl group); phenylamino, diphenylamino, benzylamino, dibenzylamino, N-benzyl-N-alkylamino and N-cycloalkyl-N-alkylamino groups which may be substituted; etc.

As the substituent group or groups which may be attached to the carbon and/or nitrogen atoms represented by a, b, c and d in the general formula (I), there may be mentioned halogen atoms, alkyl groups, alkoxy groups, amino group, substituted amino groups in which one or two hydrogen atoms of an amino group are substituted with one or two alkyl groups, allyl group and/or aralkyl groups (where both hydrogen atoms are substituted, the substituent groups may be the same or different), and nitro group. These adjacent substituent groups may form a ring.

Among the group of dyestuffs represented by the general formula (I), are generally embraced dyestuffs generally called (A) phthalide dyestuffs, (B) aza- and diazaphthalide dyestuffs and (C) fluoran dyestuffs.

Specific examples of such dyestuffs are as follows:

(A) Phthalide dyestuffs:

In the general formula (I), a, b, c and d are all carbon atoms. Namely, phthalide dyestuffs are represented by the following formula (II):

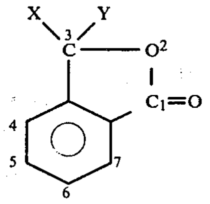

(II)

wherein, the numbers 1–7 indicate respectively positions of substituent groups, and include:

3,3-bis-(4'-dimethylaminophenyl)phthalide, (Malachite green lactone);

3,3-bis-(4'-dimethylaminophenyl)-6-dimethylaminophthalide (CVL);

3,3-bis-(4'-dimethylaminophenyl)-4,5,6,7-tetrachlorophthalide;

3,3-bis-(4'-dimethylaminophenyl)-6-ethoxyphthalide;

3-(4'-benzylmethylaminophenyl)-3-(3'-bromo-4'-diethylaminophenyl)-4-bromophthalide;

3,3-bis-(4'-dimethylaminophenyl)-5,6-benzophthalide;

3-(4'-dimethylaminophenyl)-3-(1',2'-dimethylindol-3'-yl)phthalide;

3-(4'-dibutylaminophenyl)-3-(1',2'-dimethylindol-3'-yl)phthalide;

3-(4'-dimethylaminophenyl)-3-(2'-phenylindol-3'-yl)phthalide;

3-(4'-dimethylaminophenyl)-3-(1'-methyl-2'-phenylindol-3'-yl)phthalide;

3-(4'-dimethylaminophenyl)-3-(1'-ethyl-2'-methylindol-3'-yl)-4,5,6,7-tetrachlorophthalide;

3,3-bis(1',2'-dimethylindol-3'-yl)phthalide;

3,3-bis(1'-ethyl-2'-methylindol-3'-yl)phthalide;

3,3-bis(2'-phenylindol-3'-yl)phthalide;

3,3-bis(1'-butyl-2'-methylindol-3'-yl)phthalide;

3-(1'-ethyl-2'-methylindol-3'-yl)-3-(1',2'-dimethylindol-3'-yl)phthalide;

3,3-bis(1',2'-dimethylindol-3'-yl)-6-dimethylaminophthalide;

3-(4'-dimethylaminophenyl)-3-(2'-methoxy-4'-diethylaminophenyl)-5,6-benzophthalide;

3-(4'-dimethylaminophenyl)-3-phenylphthalide;

3-(4'-dimethylaminophenyl)-3-(2',4'-bis-dimethylaminophenyl)phthalide;

3,3-bis-(4'-dimethylamino-2'-methoxyphenyl)phthalide; and 3-(4'-diethylaminophenyl)-3-(2'-methoxy-4'-diethylaminophenyl)-5,6-benzophthalide.

(B) Aza- or Diazaphthalide dyestuffs:

In the general formula (I), one or two atoms of a, b, c and d are nitrogen atoms and the remainder are carbon atoms. For example, aza- or diazaphthalide dyestuffs may be represented by the following formulae (III), (IV) and (V):

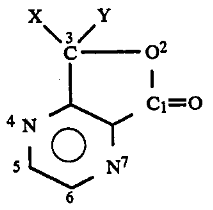

(III)

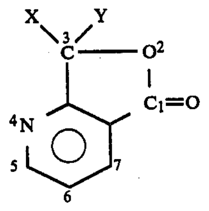

(IV)

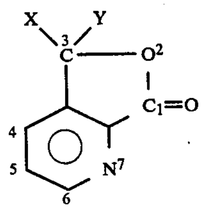

(V)

wherein, the numbers 1-7 indicate respectively positions of substituent groups, and include:

3-(4'-dimethylaminophenyl)-3-(4'-dibenzylaminophenyl)-4-azaphthalide;

3,3-bis(4-dimethylaminophenyl)-4-azaphthalide;

3-(4'-dimethylaminophenyl)-3-(4'-dimethylamino-2'-methoxyphenyl)-6-azaphthalide;

3-(4'-diethylaminophenyl)-3-(4'-methylphenylamino-2'-methylthiophenyl)-5-azaphthalide;

3-(4'-dimethylaminophenyl)-3-(4'-dimethylamino-2'-ethoxyphenyl)-7-azaphthalide;

3-(2'-methoxy-4'-diethylaminophenyl)-3-(1',2'-dimethylindol-3'-yl)-4-azaphthalide;

3-(2'-methyl-4'-diethylaminophenyl)-3-(1'-ethyl-2'-methylindol-3'-yl)-4,7-diazaphthalide;

3,3-bis(1',2'-dimethylindol-3'-yl)-7-azaphthalide;

3-(2'-ethoxy-4'-diethylaminophenyl)-3-(1'-ethyl-2'-methylindol-3'-yl)-7-azaphthalide;

3-(2'-methyl-4'-ethylaminophenyl)-3-(1'-methylpyrrol-3'-yl)-7-azaphthalide;

3-(9'-ethylcarbazole-3'-yl)-3-(1',2'-dimethylindol-3'-yl)-4-azaphthalide;

3-(9'-methyl-phenothiazine-3'-yl)-3-(1',2'-dimethylindol-3'-yl)-5-azaphthalide;

3-(9',10'-dihydro-9',10'-dimethylphenazin-2'-yl)-3-(2'-methoxy-4'-diethylaminophenyl)-4-azaphthalide;

3-(2'-ethoxy-4'-diethylaminophenyl)-3-(1'-ethyl-2'-methylindol-3'-yl)-5,6-benzo-7-azaphthalide;

3-(2'-methoxy-4'-morpholinophenyl)-3-(1'-ethyl-2'-methylindol-3'-yl)-4-ara-5,6-benzophthalide; and 3-(2'-ethoxy-4'-N-piperidinophenyl)-3-(1'-ethyl-2'-methylindol-3'-yl)-5,6-benzo-7-azaphthalide.

(C) Fluoran dyestuffs:

In the general formula (I), X and Y are coupled together to form a ring. They may for example be represented by the following formulae (VI), (VII) and (VIII):

(VI)

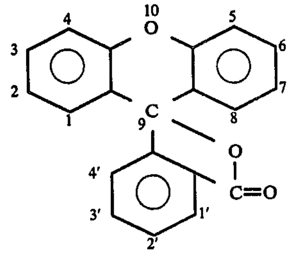

(VII)

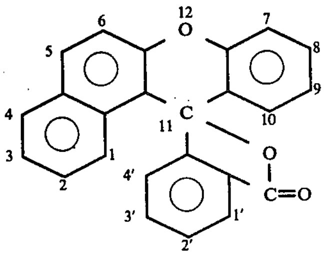

-continued

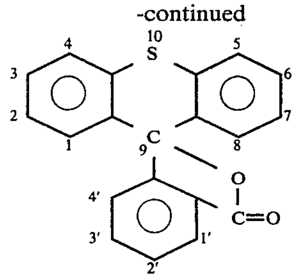

(VIII)

wherein, the numbers 1–12 and 1′–4′ indicate respectively positions of substituent groups, and include:

3,6-dimethoxyfluoran;
3-cyclohexylamino-6-chlorofluoran;
3-diethylamino-6-methyl-7-chlorofluoran;
3-diethylamino-7-benzylaminofluoran;
3-diethylamino-6-methyl-7-dibenzylaminofluoran;
3-diethylamino-5-methyl-7-dibenzylaminofluoran;
3-diethylamino-7-anilinofluoran;
3-diethylamino-6-methyl-7-anilinofluoran;
3-piperidino-6-methyl-7-anilinofluoran;
3-N-pyrrolidino-6-methyl-7-anilinofluoran;
3-methylcyclohexylamino-6-methyl-7-anilinofluoran;
3-N-ethyl-N-p-tolylamino-6-methyl-7-anilinofluoran;
1,2-benzo-6-diethylaminofluoran;
3-diethylamino-7-(orthomethoxycarbonylanilino)-fluoran;
3-diethylamino-7-N-piperidinofluoran;
3-diethylamino-7-(orthochloroanilino)fluoran;
3-diethylamino-6-methyl-7-(para-tertiary butylanilino)fluoran;
3,6-bis-diethylaminofluoran(rhodamine lactone);
3-diethylamino-7-(methatrifluoromethylanilino)fluoran;
3-dimethylamino-6,8-dimethyl-1′,2′,3′,4′-tetrachloro-fluoran;
3-dimethylamino-7,8-benzo-1′,2′,3′,4′-tetrachloro-fluoran;
2-amino-6-phenylpropylaminofluoran;
4-amino-8-(N-methyl-N-phenylamino-benzo[a]fluoran;
2-amino-8-[N-ethyl-N-(2′,4′-dimethylphenyl)amino]-benzo[c]fluoran;
3-diethylamino-5,6-benzofluoran;
3-diethylamino-7-dimethylamino-10-thiofluoran;
3-diethylamino-7-dibenzylamino-10-thiofluoran;
7-dimethylamino-1,2,3,4-tetrahydro-1,2,3,4-tetramethyl-1-aza-benzo[6]fluoran;
3,6-bis-diethylamino-5,7-diazafluoran;
4-diethylamino-5-methoxy-7-azafluoran; and
2,3-(1′-phenyl-3′-methylpyrazo-5′,4′)-4-oxyfluorocarboxyphenyl-7-dimethylaminochromenelactone.

However, none of the above phthalide, aza- and diazaphthalide and fluoran dyestuffs shall be limited to the above specific examples thereof.

Any metal ion sequestering agent may be employed in microcapsules according to this invention so long as it is united with multi-valent metal ions to form a stable chelate compound, thereby impeding inconvenient coloration that may be developed upon microencapsulation by a lactone dyestuff of the general formula (I) due to the presence of multi-valent metal ions.

As examples of such a metal ion sequestering agent, there may be mentioned:

water-soluble organic metal ion sequestering agents such as ethylenediamine tetraacetic acid; N-hydroxyethylethylenediamine triacetic acid; diethylenetriamine pentaacetic acid; nitrilotriacetic acid; triethylenetetramine hexaacetic acid; ethanol glycine; diethanol glycine;

iminodiacetic acid; glycerolether diaminetetraacetic acid; 1,2-diaminopropane-N,N′-tetraacetic acid; 1,3-diaminopropan-2-ol-tetraacetic acid; N,N-dicarboxymethyl aminobarbituric acid; 1,2-diaminocyclohexane tetracarboxylic acid; tartaric acid; gluconic acid; citric acid; saccharic acid; polyacrylic acids; and lignin sulfonic acid; as well as alkali metal salts thereof;

metal ion sequestering agents soluble in organic solvent, such as Schiff bases such as N,N′-disalicylidene ethylenediamine; 1,3-diketones such as trifluoroacetylacetone, thenoyltrifluoroacetone and pivaloylacetylacetone; and higher amide derivatives of ethylenediamine tetraacetic acid; and polyphosphates such as sodium tripolyphosphate, sodium polymetaphosphate, sodium pyrophosphate and sodium dihydrogenpyrophosphate.

Among such metal ion sequestering agents, some of the water-soluble metal ion sequestering agents have chelate formation constants with metal ions, which constants change considerably depending on the pH of a system in which they are incorporated. Accordingly, they must be suitably selected for application, taking into consideration the pH levels at microencapsulation, during the storage of microcapsule suspension, and upon coating microcapsule suspension onto a support such as paper.

For the microcapsule suspension according to this invention, one or more kinds of metal ion sequestering agents may be used suitably. The metal ion sequestering agents may be either water-soluble or oil-soluble. When two or more kinds of metal ion sequestering agents are used as a mixture, such a mixture may be formed of water-soluble and/or oil-soluble metal ion sequestering agents.

The metal ion sequestering agent is used in a proportion of 0.1–100 parts by weight per 100 parts by weight of the lactone family dyestuff having the general formula (I). Sufficient coloration-inhibitory effect can be achieved generally by using the metal ion sequestering agent in an amount of 100 parts by weight or less. When used excessively in the production of microcapsules by the coacervation method, the formation of microcapsules may sometimes be hampered.

The production of the microcapsule suspension of this invention can be carried out in accordance with, for example, the coacervation method, interfacial polymerization method or in-situ polymerization method.

The coacervation method includes the following methods:

(1) Complex coacervation method making use of the electric interaction between polycationic colloid and polyanionic colloid;
(2) Salt coacervation method utilizing the salting-out effect through the addition of an electrolyte;
(3) Simple coacervation method in which a non-solvent to hydrophilic polymers (e.g., a non-electrolyte such as alcohol) is added;
(4) Insolublization of polymer by changing the pH of an aqueous solution containing the polymer, thereby precipitating the polymer; and
(5) Phase separation method from an organic solution.

The interfacial polymerization method comprises causing a first and second polymer components, said components being capable of forming a polymer, present respectively in a dispersion medium (water) and in a core material (dyestuff-containing solution) dispersed in the dispersion medium; and allowing a polymerization or condensation reaction to occur at the boundaries between the dispersion medium and core material so as to produce microcapsules having a wall made of a synthetic resin. The interfacial polymerization method is suitable to produce, for example, microcapsules having a wall made of a synthetic resin such as nylon(polyamide), unsaturated polyester, polyureaurethane, epoxy, silicone or copolymer of an unsaturated dicarboxylic acid and styrene.

On the other hand, the in-situ polymerization method comprises supplying a monomer for a wall material and a polymerization catalyst from either the inside of a core material (dyestuff-containing solution) or the outside of the core material only, conducting its polymerization or condensation under such conditions that the polymerization or condensation reaction takes place on the surface of each core material (dyestuff-containing solution) and forming the wall of each microcapsule with the thus-prepared polymer. As a raw material, may be employed not only a monomer but also a low-molecular polymer or initial condensation product. The in-situ polymerization method may for example be used to produce microcapsules having a wall made of polystyrene, urea resin, polyurethane, melamine, the formal derivatives of polyvinylalcohol, or the like. A microencapsulation method, which is capable to conduct in water, can be applied as a production method of such microcapsules.

More specifically, the following methods may be mentioned as typical microencapsulation methods:

(1) Complex coacervation method in which a solution obtained by dissolving a lactone family dyestuff in a hydrophobic solvent having a high boiling point such as an alkylnaphthalene, diallylalkane, partially hydrogenated terphenol or alkyldiphenyl is microencapsulated making use of the coacervation between a polycationic colloid such as gelatin and an alkali metal salt of acacia, carboxymethylcellulose and/or methylvinyl ether, or copolycondensation product of maleic anhydride; and (2) In-situ polymerization method in which a wall of urea-formaldehyde resin is formed in the presence of a polymer of an anionic organic acid around each droplet of a dyestuff-containing solution, as proposed in Japanese Patent Laid-open Nos. 9079/1976 and 84882/1978.

In the above-described methods, a hydrophobic solvent of high boiling point is used as a solvent for an electron donative dyestuff represented by the general formula (I). Among such solvents may be mentioned, for example, alkylnaphthalnes, diallylalkanes, alkylbiphenyls, partially hydrogenated terphenyls, triallyldimethanes, kerosene, and alkyldiphenylethers.

By the way, the metal ion sequestering agent is incorporated in the microcapsule system in the form of powder or aqueous solution or in an oily state. In the case of water-soluble metal ion sequestering agents, it is preferred to add and dissolve them in a water phase prior to the microencapsulation step. On the other hand, where an oil-soluble metal ion sequestering agent is employed, it is desirous to dissolve it in a dyestuff-containing hydrophobic solvent soiution. Thereafter, the thus-prepared solutions are microencapsulated by virtue of various kinds of methods.

For applying the dyestuff-containing microscopic capsule suspension according to this invention to produce pressure sensitive recording paper, the microscopic capsule suspension is first converted to an aqueous coating solution by mixing it with an anti-pollutive stilt such as cellulose floc (pulp powder), starch particles (e.g., starch produced from a starch source such as wheat, corn, potatoes, sweat potatoes, sago, tapioca, rice, glutinous rice, glutionous corn or the like, a starch derivative such as an oxidized starch obtained by treating such starch with an oxidizing agent, esterified starch represented by acetylated starch, etherified starch or aldehydostarch, or denatured starch), talc, calcium carbonate particles or polystyrene resin particles as well as, as a binder, an aqueous solution of a water-soluble polymer (e.g., polyvinylalcohol, soluble starch, carboxymethylcellulose, casein, or the like), and then applying the thus-prepared aqueous coating solution on a support such as paper to obtain a coated back for pressure sensitive duplicating paper. Alternatively, such an aqueous coating solution may be coated together with its developer on the same surface of a sheet of paper, thereby providing a pressure sensitive recording paper of the self-contained type.

Compared with microscopic capsule suspension which do not contain any metal ion sequestering agent, the microscopic capsule suspension according to this invention are not colored at all or are colored extremely little and do not exhibit at all any tendency of coloration along the passage of time through their storage over a long time period.

Furthermore, a coated back of pressure sensitive recording paper, which back is coated with the microscopic capsule suspension of this invention, (1) is not colored or is colored extremely little and cannot be distinguished visually from ordinary high quality paper; (2) does not exhibit any undesirous paper stain phenomenon (i.e., coloration at the coated surface) during its storage; and (3) has thus completely solved such problems that coated surfaces are inconveniently stained (colored) during production or particularly during storage, which problems have been encountered from time to time with pressure sensitive recording paper using conventional microcapsules which do not contain any metal ion sequestering agent. The present invention has also made it possible to use certain indolylphthalide and azaphthalide dyestuffs in pressure sensitive recording paper, although their application to pressure sensitive recording paper has conventionally been hesitant as they tended to considerably color microcapsules. This has resulted in a considerable improvement to the color-developing ability (light resistant color fastness) of pressure sensitive recording paper and a diversification of hues to be developed, leading to a great industrial merit that improves the quality of such pressure sensitive paper and substantially broaden the application field of pressure sensitive recording paper. It has also been found that the use of a metal ion sequestering agent does not give any deleterious effect to the color-developing ability of pressure sensitive recording paper.

The microscopic capsule suspension of the present invention may also be applied, besides pressure sensitive recording paper, to such heat sensitive recording sheets making use of micocapsules as proposed in Japanese Pat. Publication Nos. 15227/1974 and 26597/1974 as well as in a recording method such as disclosed in U.S.

Pat. No. 3,318,697 in which microcapsules are ruptured by the heat generated by an electric current and caused to react with a developer, thereby forming an record image.

In microscopic capsule suspension of this invention, the coloration-preventive effect resulting from the use of a metal ion sequestering agent is exhibited excellently. The metal ion sequestering agent is considered to sequester metal ions derived from a microscopic capsule system (water, dyestuff, hydrophobic solvent, raw materials for making the walls of microscopic capsules, and container) as stable chelate compounds, thereby suppressing the preparation reaction of an inconvenient colored product which reaction would otherwise take place between such metal ions and the dyestuff contained in the hydrophobic solvent in the course of its microencapsulation.

The invention is further explained by reference to the following examples and comparative examples, in which parts are given by weight.

EXAMPLE 1

After mixing 12.6 parts of diisopropylnaphthalene containing 4% by weight of 3,3-bis(1'-butyl-2'-methylindol-3'-yl)phthalide dissolved therein with 25 parts of a 6% solution(I.E.P.: pH 8.2) of an acid-treated gelation containing 0.15 part of the disodium salt of N-hydroxyethyl-ethylenediamine-N,N',N'-triacetic acid, the resulting mixture was agitated at 55° C. in a homo-mixer and, while continuing the agitation, 50 parts of a 1% aqueous solution of carboxymethyl cellulose (average polymerization degree: 200, etherification degree: 0.70) were added further. The resulting mixture was then diluted with 30 parts of warm water, followed by a subsequent addition of 10% acetic acid to adjust its pH to 4.3, thereby inducing coacervation.

Then, the thus-prepared mixture was cooled to 7° C. while continuing the agitation. Then, 20 parts of 37% formaldehyde solution were added and its pH was raised to 10.0 by gradually adding dropwise an aqueous 10% NaOH solution so as to harden coacervate walls. Then, the temperature of the resulting solution was raised slowly to 40° C. It was thereafter aged at room temperature for 2 days, resulting in the preparation of a microencapsulated solution.

Subsequent to mixing 2.5 parts of an aqueous 20% solution of oxidized starch to 100 parts of the thus-obtained microencapsulated solution, the resulting mixture was coated on commercially-available high quality paper by means of a bar coater in such an amount that the quantity of the coating would be 3.5 $g/m^2$ in a dry state and was dried, thereby to prepare a coated back for pressure sensitive duplicating paper.

The microscopic capsules obtained above was white in color and the coated surface of the coated back, to which the microscopic capsules were applied, was also white. A measurement of the reflection density of the coated surface by a Macbeth transmission reflection densitometer gave a value of 0.05. No coloration was observed at all with the coated back even after a storage of the same back over 3 months in a dark place.

EXAMPLE 2

The procedure of Example 1 was followed, except for the substitution of 3-diethylamino-6-methyl-7-anilinofluoran and the trisodium salt of diethylenetriamine pentaacetic acid for 3,3-bis(1'-butyl-2' methylindol-3-yl)phthalide and the disodium salt of N-hydroxyethyl.ethylenediamine-N,N'.N'-triacetic acid respectively.

The thus-obtained microscopic capsules were white in color and no coloration was observed at all in the course of the microencapsulation step. The coated surface of a coated back, which was obtained by coating the microscopic capsules, was snow white. The reflection density of the coated surface was determined to be 0.06 by a Macbeth transmission reflection densitometer.

EXAMPLE 3

In 100 parts of phenylxylylethane containing 5% by weight of a mixture of isomers of 3-(4'-diethylamino-2'-ethoxy)-3-(1'-ethyl-2'-methylindol-3'-yl)-4-azaphthalide and 3-(4'-diethylamino-2'-ethoxy)-3-(1'-ethyl-2'-methylindol-3'-yl)-7-azaphthalide dissolved therein, was dissolved 0.3 part of trichloroacetylacetone. Another solution was prepared on the side by dissolving 20 parts by weight of an acid-treated gelatin and 0.8 part of the trisodium salt of ethylenediaminetetraacetic acid in 160 parts of water and adjusting the pH of the resulting solution to 10.0 with a 10% NaOH solution. Both solutions were combined and emulsified in a homo-mixer. A further solution was prepared on the side by dissolving 20 parts of acacia and 0.3 part of the sodium salt of a copolymer of polymethylvinyl ether and maleic anydride in 150 parts of water of 55° C. and adjusting its pH to 10.0 with an aqueous NaOH solution. The further solution was then added to the emulsion of the former two solutions. The resulting mixture was subjected to a high speed emulsification for 30 minutes.

Then, 200 parts of warm water of 55° C. were added dropwise over 30 minutes, followed by a pH adjustment to 4.2 with an aqueous 10% acetic acid solution to induce coacervation.

Thereafter, the temperature of the resulting system was cooled to 7° C., followed by a subsequent addition of 21 parts of a 37% formaldehyde solution to the system. Then, the pH of the resulting system was raised to 10.5 by adding an aqueous 10% NaOH solution over 30 minutes. Subsequently, it was heated slowly to 50° C., thereby completing the hardening of microcapsule walls and obtaining microscopic capsules.

One hundred parts of the thus-prepared microscopic capsules, 5 parts of wheat starch particles (mean particle size: 25$\mu$) and 4 parts of a 20% aqueous solution of oxidized starch were mixed together. The resulting mixture was applied in the same way as in Example 1, thereby preparing a coated back for pressure sensitive duplicating paper.

The microscopic capsules had white color in which coloration of light purple was slightly observed. However, a coated back applied with the same microscopic capsules showed visually no coloration. A measurement of reflection density of the coated surface by a Macbeth transmission reflection densitometer gave a value of 0.07.

Both microscopic capsules and paper coated therewith did not develop any tendency of coloration along the passage of time even after storing same for 6 months in a dark place.

EXAMPLE 4

The procedure of Example 3 was followed, except for the adoption of a solution obtained by dissolving 2 parts of an amide derivative of a polyaminocarboxylic acid (trade name: CHELEST MZ, product of Chelast Chemical Co., Ltd., Osaka, Japan) in 100 parts of phenylxylylethane containing 6% by weight of 3(N-methyl-N-cyclohexylamino)-6-methyl-7-anilinofluoran dissolved therein, as a dyestuff, and the exemption of the trisodium salt of ethylenediaminetetraacetic acid, resulting in the provision of gelatin-type complex coacervation microscopic capsules.

The microscopic capsules were white in color and the coated surface of a coated back for pressure sensitive duplicating paper, which coated back was prepared following the method employed in Example 1, had white color. Its reflection density was determined to be 0.06 through a measurement by a Macbeth transmission reflection densitometer. Neither microscopic capsules nor coated surface showed tendency of coloration along the passage of time.

EXAMPLE 5

To 85 parts of an aqueous 10% solution of a copolymer of ethylene and maleic anhydride (trade name: EMA-31, product of Monsanto, Missouri, U.S.A.), were added and dissolved 180 parts of water containing 1.0 part of the disodium salt of ethylenediaminetetraacetic acid dissolved therein, 10 parts of urea and 1 part of resorcin. Then, the pH of the system was adjusted to 3.3.

Then, another solution was prepared on the side by dissolving under heat 8 parts of 3-pyrrolidyl-6-methyl-7-anilinofluoran and 0.4 part of the dilaurylamide of ethylenediaminetetraacetic acid in 170 parts of diisopropylnaphthalene. The another solution was poured into the former aqueous solution and both solutions were emulsified in a homo-mixer rotated at a high speed. To the resulting emulsion, were immediately added 26 parts of 37% aqueous formaldehyde solution. The resulting mixture was maintained at 55° C. for 2 hours with stirring and then allowed to cool down, thereby obtaining microscopic capsules with wall made of urea resin. One hundred parts of the thus-prepared microscopic capsules, 125 parts of water, 10 parts of celluose floc and 40 parts of a 10% solution of hydroxyethyletherified starch were mixed together and its pH was adjusted to 8.0. The thus pH-adjusted mixture was coated on a sheet of paper of good quality by means of a Meyer bar to prepare a coated back for pressure sensitive duplicating paper.

The microscopic capsules had white color which was slightly tinted with green. However, the coated back applied with the microscopic capsules did not show any color. The reflection density of the coated surface was found to be 0.06 by a Macbeth transmission reflection densitometer. Neither microscopic capsules nor coated surface showed tendency of coloration along the passage of time.

EXAMPLE 6

The procedure of Example 5 was followed, except for the substitution of 3-(4′-diethylamino-2′-methylphenyl)-3-(1′-ethyl-2′-methylindol-3′-yl)-4,7-diazaphthalide and a mixture of 1 part of the disodium salt of N-hydroxyethyliminodiacetic acid and 2.0 parts of the trisodium salt of diethylenetriamine pentaacetic acid for 3-pyrrolidyl-6-methyl-7-anilinofluoran and 1.0 part of the disodium salt of ethylenediaminetetraacetic acid respectively, thereby preparing microscopic capsules and a coated back for pressure sensitive duplicating paper. Slight blue tint was recognized with the microscopic capsules only, but substantially no coloration was observed on the coated surface of the pressure sensitive duplicating paper. The coated surface had a reflection density of 0.07 according to a measurement by a Macbeth transmission reflection densitometer. Neither microscopic capsules nor coated surface showed tendency of coloration along the passage of time.

EXAMPLE 7

The procedure of Example 5 was also followed, except for the substitution of 3,3-bis(4′-diamethylamino)-6-dimethylaminophthalide and a mixture of 3.0 parts by weight of the disodium salt of triethylenetetramine.hexaacetic acid and 0.5 part of sodium tripolyphosphate($Na_5P_3O_{10}$) for 3-pyrrolidyl-6-methyl-7-anilinofluoran and 1.0 part of the dissodium salt of ethylenediaminetetraacetic acid respectively, resulting in the preparation of microscopic capsules and a coated back for pressure sensitive duplicating paper.

EXAMPLE 8

A mixture obtained by combining 67 parts of isopropyldiphenyl containing 3.5% by weight of 3,3-bis(1′-ethyl-2′-methylindol-3′-yl)phthalide dissolved therein and 25 parts of terephthalic chloride was mixed with 250 g of water containing 4 parts of polyvinyl alcohol, 0.8 part of the trisodium salt of N-hydroxyethyl-N,N′,N′-ethylenediaminetriacetic acid and 0.1 part of sodium pyrophosphate. The resulting mixture was then emulsified in a homo-mixer and maintained at 25° C. Then, a homogeneous solution of 0.5 part of ethylenediamine, 10 parts of hexamethylenediamine, 10 parts of NaOH and 75 parts of water was slowly added dropwise to the emulsion, thereby causing a polyamidation reaction at interface of the emulsion and each droplet of the solution between terephthalic chloride and the amines. The microencapsulation was completed in 30 minutes after the completion of the dropwise addition of the solution.

The resulting microscopic capsules were tinted light yellow. However, when applied in the same way as in Example 5, the resulting coated back for pressure sensitive duplication paper had white color. A measurement of the reflection density of the coated surface by a Macbeth transmission reflection densitometer gave a value of 0.07.

No tinting was observed along the passage of time with respect to both microscopic capsules and coated back.

COMPARATIVE EXAMPLES 1-8

Microscopic capsules and coated backs for pressure sensitive duplicating paper were prepared respectively in accordance with the procedures in Examples 1 through 8, without the metal ion sequestering agents. Each microscopic capsules and their corresponding coated back for pressure sensitive duplicating paper showed coloration. Moreover, it was recognized that the degree of coloration had the tendency of increasing during their storage over a long time period.

In Table I, are summarized the degrees of coloration of microscopic capsules and coated backs applied with the microscopic capsules for the production of pressure sensitive duplicating paper, which were obtained in the above examples of this invention and comparative examples.

TABLE I

| | Hue of microscopic capsules | Coloration of microscopic capsules along the passage of time | Hue of coated surface of pressure sensitive duplicating paper* | Coloration of coated surface along time passage | Hue developed on paper coated with phenol resin type developer (sensitized underpaper) |
|---|---|---|---|---|---|
| Ex. 1 | white | unchanged | white (0.05) | unchanged | red (pink) |
| Com. Ex. 1 | yellow | tinted | slightly reddish yellow (0.14) | tinted | red (pink) |
| Ex. 2 | white | unchanged | white (0.06) | unchanged | black |
| Com. Ex. 2 | brownish grey | tinted | brownish grey (0.11) | tinted | black |
| Ex. 3 | light purple | unchanged | white (0.07) | unchanged | blue |
| Com. Ex. 3 | royal purple | unchanged | royal purple (0.23) | unchanged | blue |
| Ex. 4 | white | unchanged | white (0.06) | unchanged | black |
| Com. Ex. 4 | brownish grey | tinted | grey (0.11) | tinted | black |
| Ex. 5 | greenish white | unchanged | white (0.06) | unchanged | black |
| Com. Ex. 5 | greenish grey | tinted | grey (0.10) | tinted | black |
| Ex. 6 | pale white | unchanged | white (0.07) | unchanged | blue |
| Com. Ex. 6 | blue | unchanged | blue (0.18) | unchanged | blue |
| Ex. 7 | white | unchanged | white (0.06) | unchanged | blue |
| Com. Ex. 7 | pale | unchanged | pale (0.10) | unchanged | blue |
| Ex. 8 | white | unchanged | white (0.07) | unchanged | red (pink) |
| Com. Ex. 8 | yellow | unchanged | reddish yellow (0.18) | tinted | red (pink) |

*Figures in brackets ( ) indicate reflection density values determined by a Macbeth transmission reflection densitometer with respect to their corresponding coated surfaces.

What is claimed is:

1. Dyestuff-containing microscopic capsule suspension for record materials, which comprises in microscopic capsules a lactone family dyestuff having formula (I):

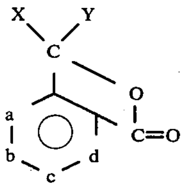

(I)

wherein a, b, c and d are each a carbon atom or either one or two atoms of said a, b, c and d are nitrogen atoms and the remaining atoms are carbon atoms, said a, b, c and d can have one or two substituent groups, adjacent a—b, b—c or c—d bond can form another ring, X and Y represent individually a benzene, naphthalene or aromatic heterocyclic ring which can include one or more subtituent groups, and X and Y can be the same or different and can be coupled together to form a ring; and a metal ion sequestering agent in the microscopic capsules or in a liquid medium wherein the capsules are suspended, the water-soluble and organic metal ion sequestering agent being ethylenediaminetetraacetic acid, N-hydroxyethyl-ethylenediamine triacetic acid, diethylenetriamine pentaacetic acid, nitrilotriacetic acid, triethylenetetramine hexaacetic acid, ethanol glycine, diethanol glycine, iminodiacetic acid, glyceroletherdiamine tetraacetic acid, 1,2-diaminopropane-N,N'-tetraacetic acid, 1,3-diaminopropan-2-ol-tetraacetic acid, N,N-dicarboxylmethylaminobarbituric acid, 1,2-diaminocyclohexane tetracarboxylic acid, tartaric acid, gluconic acid, citric acid, saccharic acid, polyacrylic acid or lignin sulfonic acid, or an alkali metal salt thereof.

2. Dyestuff-containing microscopic capsule suspension for record materials, which comprises in microscopic capsules a lactone family dyestuff having formula (I):

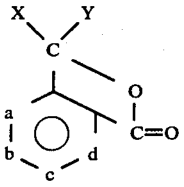

(I)

wherein a, b, c and d are each a carbon atom or either one or two atoms of said a, b, c and d are nitrogen atoms and the remaining atoms are carbon atoms, said a, b, c and d can have one or two substituent groups, adjacent a—b, b—c or c—d bond can form another ring, X and Y represent individually a benzene, naphthalene or aromatic heterocyclic ring which can include one or more substituent groups, and X and Y can be the same or different and can be coupled together to form a ring; and a metal ion sequestering agent in the microscopic capsules or in a liquid medium wherein the capsules are suspended, the metal ion sequestering agent soluble in organic solvent being a Schiff base, a 1,3-diketone or a higher amide derivative of ethylenediaminetetraacetic acid.

3. Dyestuff-containing microscopic capsule suspenson for record materials, which comprises in microscopic capsules a lactone family dyestuff having formula (I):

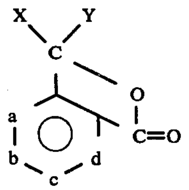

(I)

wherein a, b, c and d are each a carbon atom or either one or two atoms of said a, b, c and d are nitrogen atoms and the remaining atoms are carbon atoms, said a, b, c and d can have one or two substituent groups, adjacent a—b, b—c or c—d bond can form another ring, X and Y represent individually a benzene, naphthalene or aromatic heterocyclic ring which can include one or more substituent groups, and X and Y can be the same or different and can be coupled together to form a ring; and a metal ion sequestering agent in the microscopic capsules or in a liquid medium wherein the capsules are suspended, 0.1/100 parts by weight of the metal ion sequestering agent being used per 100 parts by weight of the lactone family dyestuff, and the metal ion sequestering agent being a sodium salt of ethylenediaminetetraacetic acid, a sodium salt of diethylenetriamine pentaacetic acid, a sodium salt of triethylenetetramine hexaacetic acid, a higher aliphatic amide of ethylenediaminetetraacetic acid and a sodium salt of N-hydroxyethyl-ethylenediamine-N,N',N'-triacetic acid.

* * * * *